United States Patent

Kozdas

Patent Number: 5,575,445
Date of Patent: Nov. 19, 1996

[54] STOVE-TOP AID

[76] Inventor: Anthony B. Kozdas, R.R. #2, Stirling, Ontario, Canada, K0K 3E0

[21] Appl. No.: 196,696
[22] Filed: Feb. 14, 1994
[51] Int. Cl.⁶ .................................................. F16M 13/00
[52] U.S. Cl. ................................. 248/287.1; 248/316.5
[58] Field of Search ........................... 248/276.1, 279.1, 248/287.1, 286.1, 316.1, 316.7, 74.2, 316.5; 126/24, 42, 39 B

[56] References Cited

U.S. PATENT DOCUMENTS

| 1,716,530 | 6/1929 | Oliver | 248/230.4 |
|---|---|---|---|
| 2,242,833 | 5/1941 | Nibur . | |
| 2,287,485 | 6/1942 | Pierce | 248/230.4 X |
| 2,497,194 | 2/1950 | White . | |
| 2,568,266 | 9/1951 | Arnold . | |
| 3,117,673 | 1/1964 | Hatfield et al. | 248/315 |
| 3,432,136 | 3/1969 | Penney . | |
| 3,515,116 | 6/1970 | Finnstrand | 126/42 |
| 3,659,731 | 5/1972 | Carson . | |
| 4,434,961 | 3/1984 | Hoye . | |
| 4,721,276 | 1/1988 | Moss . | |
| 4,802,646 | 2/1989 | Cattani | 248/316.5 |
| 4,955,574 | 9/1990 | Freier | 248/316.5 |
| 5,014,956 | 5/1991 | Kayali . | |

FOREIGN PATENT DOCUMENTS

| 721935 | 11/1965 | Canada . | |
|---|---|---|---|
| 2484432 | 5/1975 | France | 248/74.2 |
| 64881 | 1/1942 | Norway | 126/24 |
| 888704 | 1/1962 | United Kingdom | 126/42 |

Primary Examiner—Karen J. Chotkowski
Attorney, Agent, or Firm—Robert M. Phipps

[57] ABSTRACT

A stove-top aid is described which is attached to the side of a conventional cooking oven or range. The stove-top aid comprises a clamping device for releasable attachment to the handle of a cooking pot or pan thus reducing the risk of the cooking pots or pans from being accidently overturned, while on the stove, and spilling their hot contents. The stove-top aid also secures the cooking pot or pan in such a manner to allow stirring, or other cooking action, with a single hand, i.e. there is no need to hold the handle of the pot or pan in one hand and the stirring or cooking utensil in a second hand.

1 Claim, 3 Drawing Sheets

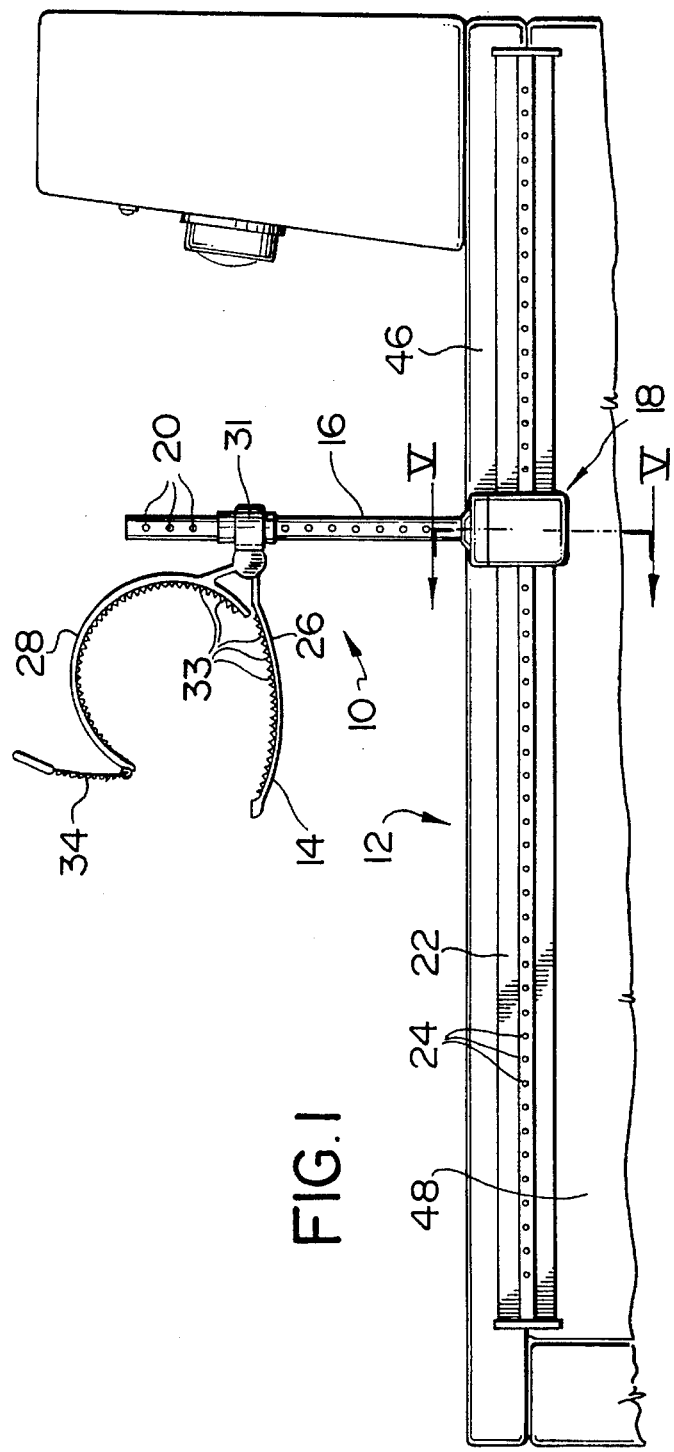
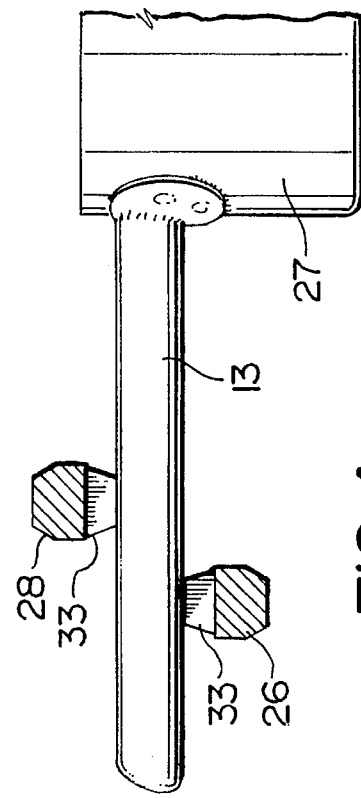
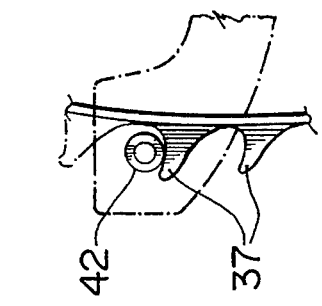

STOVE-TOP AID

FIELD OF INVENTION

This invention relates to a stove-top aid to reduce the risk of a cooking pot or pan on a stove or range from being accidently overturned. This invention further allows stirring or other cooking operations to be conducted with the use of only one hand as the pot or pan is tightly secured by the stove-top aid. Specifically, this invention relates to a stove-top aid comprising a clamping device, indirectly attached to the cooking stove or range, which not only securely holds the handle of the cooking pot or pan, but also exerts a downward pressure on the handle thus stabilizing and biasing the cooking pot or pan against the cooking element.

BACKGROUND OF THE INVENTION

Young children are especially vulnerable to reaching up and pulling cooking pots and pans off the stove and spilling the contents over themselves. This safety hazard has been addressed in Canadian patent 721,935. In this patent, there was provided a ring which was adapted to closely encircle the cooking pot or pan. In this reference it was necessary to provide a plurality of rings with different diameters to suit a range of pan and pot sizes. Although the prior art did provide a pair of upwardly directed lugs on the rings between which the handle of a pan could be placed, there was no corresponding handle securing device for a pot.

The present invention thus addresses the problem of providing a safer environment for small children and others in and around a cooking stove, when it is in use, by securing the cooking pot or pan to the stove and thus reducing the incidence of accidental spillage. The present invention further provides a stabilizing means which secures the cooking pot or pan by biasing the same against the cooking element thus allowing the contents of the pot or pan to be stirred, or other cooking operations to be conducted, without requiring a second hand to hold the pot or pan.

SUMMARY OF THE INVENTION

The present invention therefore is directed to a stove-top aid which is adapted to secure the position of cooking pots or pans on the stove in order to prevent accidental spillage of their contents. The stove-top aid of the present invention secures the cooking pots or pans in such a manner that the contents of the cooking vessels can be stirred, or other cooking operations can be conducted, without requiring an additional hand to hold the cooking pot or pan stable.

According to the present invention there is provided a stove-top aid for securing pots and pans on a stove comprising:

attachment means adapted to be attached to a stove;

a support member depending from said attachment means, and arranged generally to be above said cooking surface in use; and clamping means adapted to be mounted on said support member, including at least a pair of pivotally connected opposed claws, at least one of the claws being mounted for movement toward the other to engage a pot or pan handle therebetween, wherein the clamping means provides a downward force against the handle of the pot or pan to bias the pot or pan against the stove.

In a further embodiment of the present invention there is provided a stove-top aid for securing pots and pans on a stove comprising:

attachment means adapted to be attached to a stove;

a support member depending from said attachment means, and arranged generally to be above said cooking surface in use;

clamping means adapted to be mounted on said support member, including at least a pair of pivotally connected opposed claws, at least one of the claws being mounted for movement toward the other to engage a pot or pan handle therebetween, wherein the clamping means provides a downward force against the handle of the pot or pan to bias the pot or pan against the stove; and locking means associated with the claws for closing and locking said claws and having a hand manipulable release mechanism for releasing said claws from said locked position.

BRIEF DESCRIPTION OF THE DRAWINGS

These and other features of the invention will become apparent by way of example, from the following description in which reference is made to the appended drawings wherein:

FIG. 1 is a side view of a stove-top aid attached to the side of a cooking stove or range wherein its clamping means is in an open position;

FIG. 3 shows one embodiment of a locking means according to the present invention;

FIG. 4 is a cross-sectional view, along a line IV—IV of FIG. 2, showing the position of the claws on a handle;

DESCRIPTION OF THE PREFERRED EMBODIMENT

Figure 2:
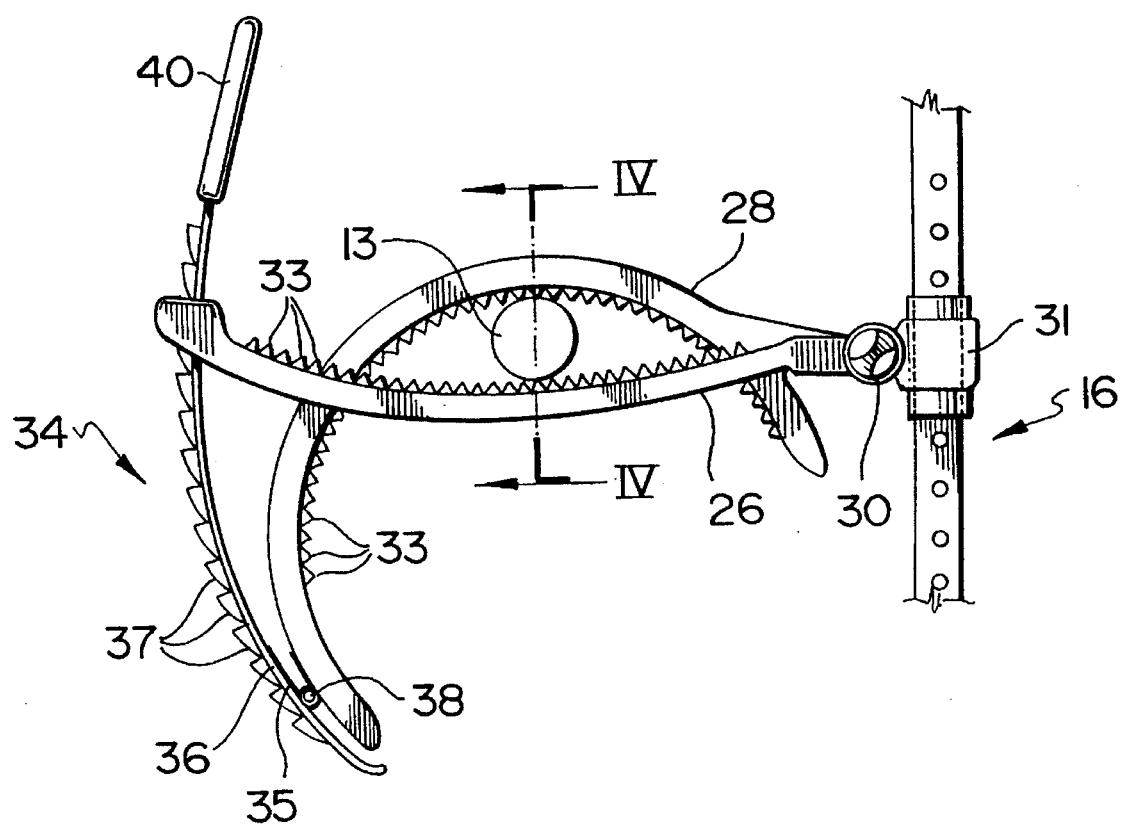
FIG. 2 shows the clamping means in a locked position.

FIG. 1 shows a stove-top aid, generally referred to by reference numeral 10, attached to the side of a conventional stove top or range 12. The stove-top aid comprises generally, an attachment means 18, attached to the side of the stove 12, a support member 16 depending vertically upward from the attachment means 18, a clamping means 14 slidably mounted on the support member 16 and having a pair of opposed claws 26 and 28 respectively. The pair of claws comprise; an upper claw 28, and lower claw 26, with the upper claw 28 being movable toward the lower claw 26 to engage the pot handle (not shown) therebetween, and a locking means, generally referred to by reference numeral 34, for closing and locking the claws 26 and 28 around the handle.

Figure 6:
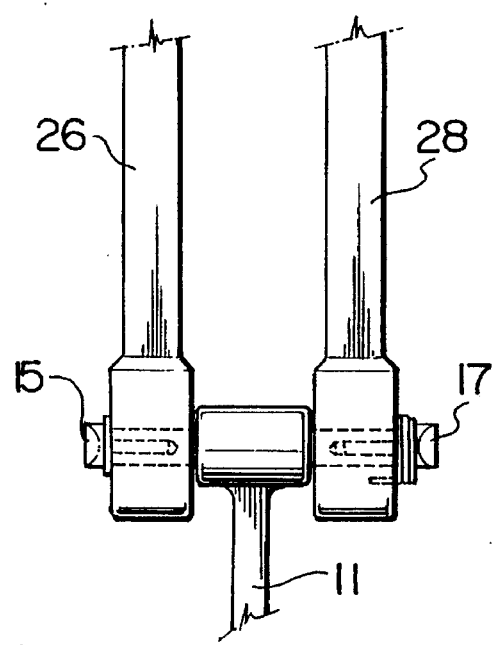
FIG. 6 shows an example of the pivot as a T-shaped pin.

Referring to FIG. 2 the clamping means 14 is shown in the locked position. The upper 28 and lower 26 claws are each pivotally attached at one end thereof to a pivot 30 on a mounting collar 31 which in turn is slidably mounted on the vertical support member 16. The lower claw 26 is generally fixed in position, relative to the vertical support member 16 and, as shown, extends generally parallel to the stove top, when in use. The upper claw 28 is more freely pivotable relative to the lower claw and incorporates a spring bias mechanism in the mounting collar 31 at its pivot end 30 in order that the claw may rise automatically to an open position when the lock means 34 is released, thus allowing the pot handle 13 to be readily removed from between the claws. Each of the claws are curved toward each other with the upper claw 28 preferably having a larger radius of curvature than the lower claw 26. Preferably the pivot 30 is a T-shaped bar 11 (shown in FIG. 6) with the two claw ends being held in position at the ends of the T-shaped bar with two pins 15 and 17, cooperating with the T-shaped bar 11, wherein the pin 17 holding the upper claw 28 in position is preferably spring loaded. In a further embodiment of the present invention, the T-shaped bar could include a second rotation means so that the claws can be tilted for greater versatility.

Both the upper and lower claws 28 and 26 include a resilient coating material on their sides facing each other in order to better grasp and to minimize possible damage to the handle 13 by the claws 26 and 28. In a preferred embodiment, this resilient material is a plurality of rubber-like tooth-shaped projections 33. It is not necessary that the resilient material, found inside the claws be formed into a tooth-like formation, however, this type of structure will aid in the overall gripping action on the pot or pan handle 13. It is preferred that this material be easily replaceable as it will undoubtedly wear more readily than the overall assembly. This may be achieved by sliding a continuous string of tooth-like connections in a track on the inner facing surface of the claws (not shown).

As discussed previously, the locking means 34 is used to secure the position of the two claws 26 and 28, when in the closed position. In the preferred embodiment, the locking means is a ratchet bar 36 and pawl 42 mechanism with the ratchet bar 36 being a bar pivotally attached at one end 38 thereof to the upper claw 28 at an end remote from its pivot 30. The pawl 42 (shown in FIG. 3) is carried on the lower claw 26, also at an end remote from the pivot 30. The ratchet bar 36 is biased by a spring 35 to bear against the pawl 42, and is simply released by a single finger or thumb pressure applied to the end 40, remote from the pivot 38 to thereby compress the spring 35 and release the ratchet teeth 37 from the pawl 42, thus allowing the claws 26 and 28 to be opened.

In a preferred embodiment the pawl 42 is a hard metal rotating lug (as shown in FIG. 3) attached to the one side of the lower claw 26. By providing a rotating lug, the frictional wear on the ratchet 36 is greatly reduced while allowing the claws 26 and 28 to be closed extremely tightly.

Referring to FIG. 4, the position of the upper and lower claws, as engaged on either side of a pot or pan handle 13 is shown. As noted previously, the lower claw 26 is generally fixed, whereas the upper claw 28 is movable and pushes against the pan or pot handle resting on the lower claw 26 and thus provides an active force against the pot or pan handle 13, whereas the action of the lower claw 26 is more passive. Furthermore the upper and lower claws are staggered in a horizontal plane, with the upper claw 28 being positioned between the position of the lower claw 26 and the pot 27. As a result, the upper claw 28 provides a downward pressure against the pot or pan handle while the lower claw acts as a fulcrum, thereby further forcing the pot against the stove top. By this arrangement, not only does the clamping means 14 provide a means for holding the pot and pan so that it cannot be easily tipped, but the clamping means also provides a downward pressure on the pot or pan thus stabilizing the same more securely on the element of the stove by biasing the pot or pan against the stove element to allow for one hand mixing, or other cooking operations. This is particularly preferred if a person's second hand or arm is otherwise occupied for example in holding a small child or if incapacitated for some other reason.

Returning to FIG. 1, the vertical support member 16 allows the vertical position of the clamping means 14 to be easily changed, to adapt to different heights of cooking pans or pots. Any method of connecting the mounting collar 31 to the vertical support member 16 could be used according to the present invention, provided that it is a moveable connection, which allows the height of the mounting collar 31 to be easily changed. For example, the clamping means 14 can be attached to the vertical support member 16 by a pressure fit system, a cam system or a screw-type system. In the embodiment shown in the accompanying drawings, the mounting collar 31 is attached to the vertical support member by a hole and pin system wherein the vertical support member comprises a plurality of holes, 20 and the collar 31 carries a removable pin (not shown), which may be inserted through the collar into one of the plurality of holes 20 in the vertical support member at any appropriate height.

In one embodiment of the present invention, the vertical support member 16 is flat on at least two sides in order to provide resistance to lateral twisting of the mounting collar 31 and thus provide a more secure stove top aid.

Figure 7:
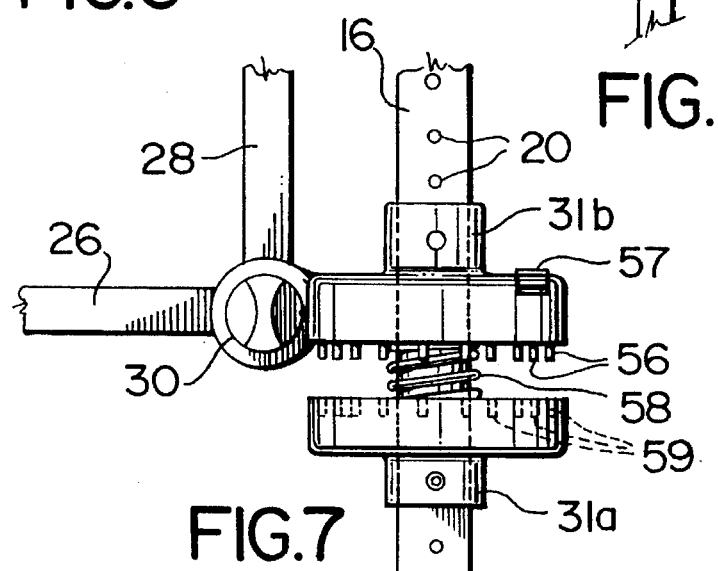
FIG. 7 shows an embodiment of the collar, providing rotation of the clamping means about the axis of the vertical support member.

In an additional embodiment of the present invention, as depicted in FIG. 7, the collar 31 comprises two sections in rotatable relationship to each other. The first of the two collar sections, 31a is releasably secured to the vertical support member 16, as described previously. The second collar section 31b is locked in position to the first collar section 31a, when the stove top aid is in use. The second collar section 31b carries the pivot 30 and when not in use, section 31b can be unlocked from section 31a, allowing the clamping means 10 to be rotated about the axis of the vertical support member. Thus allowing the clamping means 18 to be moved to an out-of-the-way position, without having to remove the clamping means 18 from the vertical support member 16.

A number of means can be used to provide a rotatable relationship between the two sections of the collar and also provide a means to lockably engage the two collar sections together. In one example of this embodiment, as shown in FIG. 7, the two sections of the collar are secured to each other by a cam/spring locking means. A plurality of positioning pins, 56 are located on the outer surface of the side of the collar section facing the other collar section, which cooperates with corresponding holes 59 in the second collar section. In the embodiment depicted in FIG. 7, the pins 56 are located in the second collar section 31b. The corresponding holes 59 would be located in collar section 31a. An optional feature of this example comprises a spring 58 which is juxtaposed between the two sections of the collar to allow free movement of collar section 31b in relationship with collar section 31a. The spring 58 being of sufficient size so that the aperture of the spring will easily fit over the vertical support member 16. The cam 57 releases a locking pin or lever (not shown) that engages a locking means which can comprise a lip or edge protruding around the inner edge of collar 31a. The cam preferably is spring loaded to assist in the locking of the two collar sections. In a further embodiment of the present invention, the spring can be replaced by a plurality of ball bearings.

Referring to the description of FIG. 2, it was mentioned that the upper claw 28 is more freely pivotable than the lower claw 26, however, in some instances the lower claw may be secured to the pivot 30 by way of a screw which may be loosened to allow the lower claw to be moved to a vertical position.

It may be necessary in some instances to extend the height of the vertical support member 16, at which time an extension may be added (not shown in the drawings). The clamping means 14 would first be removed from the vertical support member 16 and a vertical support member extension (not shown) would be placed at the top end of the vertical support member and securely attached thereto. The clamping means 14 would then be secured into position at the desired height on the extension in the same manner that it is secured to the vertical support member 16.

The vertical support member 16 is connected at its base to an attachment means adapted to provide attachment to the stove. Any suitable type of attachment means, including a clamping system or a screw attachment, could be used according to the present invention provided that it is secure enough to resist the pressures and force which will be placed on the stove-top aid, when in use. A further consideration for the attachment means is that it be moveable along the side of the stove allowing the stove-top aid to be used for securing the position of pots and pans either on the front or back elements.

In the embodiment shown in FIG. 1 of the present invention, the attachment means is removably attached to a rail 22 which is itself attached to the side of the stove. The rail is provided with a plurality of holes 24 which cooperate with a locking pin or lug (not shown) positioned on the side of the attachment means 18 facing the rail. The rail 22 traverses the entire side of the stove so that the greatest flexibility of positioning of the vertical support member can be realized. Attachment of the rail 22 to the stove can be accomplished by a number of means including direct screw attachment of the rail to the stove, either at the top portion 46 or the oven portion 48 thereof.

Figure 5:
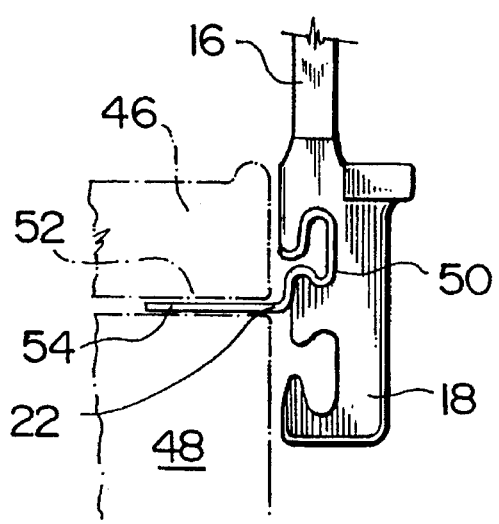
FIG. 5 is a partial cross-sectional view of the stove-top aid attached to the stove taken along line V—V of FIG. 1.

In the embodiment depicted in the accompanying drawings (see especially FIG. 5), the rail 22 is shaped so as to provide an inner open area to cooperate with and attach over a hooked end 50 of an attachment bar, generally referred to by reference numeral 52, which also has a connecting end 54 for attachment to the top portion of the stove. In the embodiment shown in the accompanying drawings, the connecting end 54 is positioned within the space provided between the stove top 46 and oven portion 48 of a conventional stove or range.

Any means of attaching the connecting end 54 to the stove can be used, however, a secure way of making such attachment is by way of screws or similar means. It would also be possible to spot weld the connecting end 54 into place. It would also be obvious that a number of attachment bars 52 are provided so that the rail is attached to the stove or range at a number of points along the length of the rail to provide a secure attachment of the rail 22.

The rail 22, in having an inner cavity to cooperate with and attach over the hooked end 50, provides a contact between the hooked end and the rail at a number of locations thus providing maximum support, which will limit horizontal or lateral twisting of the rail. As noted previously, the rail further comprises a plurality of holes 24 to cooperate with the locking pin of the attachment means 18. In one embodiment of the present invention, as shown in the partial cross-sectional view of FIG. 5, the inner portion of the connecting means 18 is adapted to follow the shape and curve of the rail 22. Again, as noted above, this provides maximum contact between the rail and the attachment means 18 ensuring maximum support to prevent horizontal or lateral twisting of the attachment means.

The rail 22, in one embodiment of the present invention, is coated with a non heat-conductive material, where the rail is in contact with the stove, to reduce transfer of heat from the stove when in use. Any type of non heat-conductive material can be used, for example, heat resistant plastics. The non heat-conductive material can be placed on the rail, or components thereof by either dip-coating or by spraying or painting the material onto the portions which come into contact with the stove.

Figure 8:
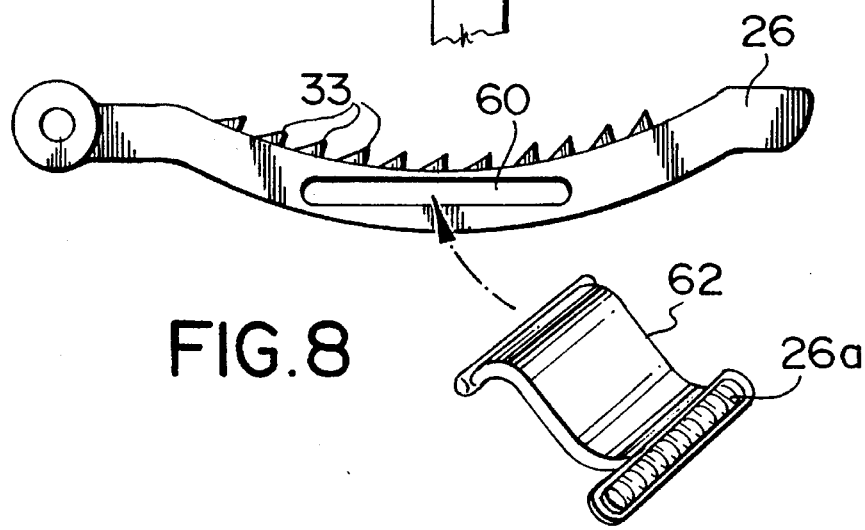
FIG. 8 depicts an embodiment of the invention wherein there are two lower claws.

In one embodiment of the present invention, as depicted in FIG. 8, the lower claw 26 is adapted to provide for the connection of an additional lower claw 26a. In the specific embodiment shown in FIG. 8, the lower claw 26 contains a slot 60, which cooperates with a tab 62, which in turn is connected to an additional lower claw 26a. The additional lower claw is positioned between the upper claw 28 and the pot, which provides a more stable clamping means, particularly for light-weight vessels.

The stove-top aid according to the present invention can be prepared from a number of different materials which would be readily apparent to persons skilled in the art. The components can be formed from metal, metal alloys, metal or plastic mixtures or ceramic material. The resilient material found on the inner side of the two claws can be made of any resilient material comprising either rubber or plastics.

It is understood that the invention has been disclosed herein in connection with certain embodiments. However, such changes, modifications or equivalents as can be used by those skilled in the art are intended to be included. Accordingly, the disclosure is to be construed as exemplary, rather than limitative, and such changes within the principles of the invention as are obvious to one skilled in the art are intended to be included within the scope of the claims.

The embodiments of the invention in which an exclusive property or privilege is claimed are defined as follows:

1. An apparatus adapted to securing pots or pans on a stove top, said apparatus comprising:

a. a clamping means movable between an opened and a closed position, mounted on a vertical support member and adapted to hold the handle of a cooking pot or pan wherein the clamping means comprises an upper claw and a lower claw attached by biasing means and together attached to said vertical support member wherein the upper claw is adapted to provide a downward force against the handle of a cooking pot or pan when in the closed position to bias a cooking pot or pan against the stove;

b. an attachment means connected to the vertical support member and adapted to provide attachment to the stove;

c. a rail adapted to provide a means for moving the attachment means horizontally on the rail;

d. a locking means comprising a ratchet and pawl mechanism, wherein the ratchet of said mechanism is a bar pivotally attached at one end thereof to the upper claw at an end remote from its pivot connection to the opposed claw and the pawl of said mechanism is carried on the lower claw at an end remote from the pivot and wherein said ratchet bar comprises ratchet teeth, said ratchet teeth cooperate with the pawl to lockably engage the claws and wherein said ratchet teeth are released from the pawl by a hand manipulable release.

\* \* \* \* \*